United States Patent
Doi et al.

(10) Patent No.: US 9,873,349 B2
(45) Date of Patent: Jan. 23, 2018

(54) HYBRID CONSTRUCTION MACHINE

(71) Applicant: KOBELCO CONSTRUCTION MACHINERY CO., LTD., Hiroshima-shi (JP)

(72) Inventors: Takayuki Doi, Hiroshima (JP); Yusuke Kamimura, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 65 days.

(21) Appl. No.: 15/013,221

(22) Filed: Feb. 2, 2016

(65) Prior Publication Data

US 2016/0250936 A1 Sep. 1, 2016

(30) Foreign Application Priority Data

Feb. 26, 2015 (JP) ................. 2015-036577

(51) Int. Cl.
*B60L 11/18* (2006.01)
*B60K 6/22* (2007.10)
(Continued)

(52) U.S. Cl.
CPC .............. *B60L 11/187* (2013.01); *B60K 6/22* (2013.01); *B60L 11/1861* (2013.01);
(Continued)

(58) Field of Classification Search
CPC ........ B60K 6/22; E02F 9/2296; E02F 9/2075; E02F 9/2091; E02F 9/2235; E02F 9/2246;
(Continued)

(56) References Cited

U.S. PATENT DOCUMENTS 7,597,165 B2 * 10/2009 Kaneko ................. B60K 6/365
180/65.285
9,617,714 B2 * 4/2017 Ishihara ................ E02F 9/2075
(Continued)

FOREIGN PATENT DOCUMENTS

EP 2 703 567 A1 3/2014
JP 11-117914 4/1999
(Continued)

OTHER PUBLICATIONS

Extended Search Report dated Aug. 3, 2016 in European Patent Application No. 16152513.4.

*Primary Examiner* — Atul Trivedi
(74) *Attorney, Agent, or Firm* — Oblon, McClelland, Maier & Neustadt, L.L.P.

(57) ABSTRACT

A first warming-up control unit calculates warming-up time charging power from a power storage SOC and power storage temperature and causes a generator motor to perform power generation operation thereby charging a power storage unit on the basis of the calculated warming-up time charging power. A second warming-up control unit applies, during the power generation operation, a hydraulic load to a hydraulic pump by a hydraulic load unit and performs horsepower control of the hydraulic pump using a value obtained by subtracting the warming-up time charging power from preset warming-up time pump horsepower.

5 Claims, 6 Drawing Sheets

(51) Int. Cl.

| | | |
|---|---|---|
| *B60W 30/194* | (2012.01) | |
| *E02F 9/20* | (2006.01) | |
| *E02F 9/22* | (2006.01) | |
| *F02D 29/06* | (2006.01) | |
| *F15B 21/04* | (2006.01) | |
| *F02D 29/04* | (2006.01) | |

(52) U.S. Cl.
CPC ......... *B60W 30/194* (2013.01); *E02F 9/2075* (2013.01); *E02F 9/2091* (2013.01); *E02F 9/226* (2013.01); *E02F 9/2235* (2013.01); *E02F 9/2246* (2013.01); *E02F 9/2296* (2013.01); *F02D 29/04* (2013.01); *F02D 29/06* (2013.01); *F15B 21/042* (2013.01); *B60Y 2200/412* (2013.01); *B60Y 2200/92* (2013.01); *B60Y 2300/91* (2013.01); *Y10S 903/93* (2013.01)

(58) Field of Classification Search
CPC ..... E02F 9/226; B60L 11/187; B60L 11/1861; B60Y 2200/412; B60Y 2200/92; B60Y 2300/91; Y10S 903/93; B60W 30/194; F02D 29/06; F02D 29/04; F15B 21/042
USPC .......................................................... 701/22
See application file for complete search history.

(56) References Cited

U.S. PATENT DOCUMENTS

| | | | | |
|---|---|---|---|---|
| 2004/0148817 | A1* | 8/2004 | Kagoshima | B60K 6/12 37/348 |
| 2005/0003925 | A1* | 1/2005 | Wakashiro | B60K 6/485 477/2 |
| 2011/0071738 | A1* | 3/2011 | Kawasaki | E02F 9/2075 701/50 |
| 2011/0093150 | A1* | 4/2011 | Yanagisawa | B60K 6/365 701/22 |
| 2011/0115223 | A1* | 5/2011 | Stahlkopf | F01K 13/02 290/7 |
| 2011/0270481 | A1* | 11/2011 | Koga | B60L 1/003 701/22 |
| 2012/0109472 | A1* | 5/2012 | Yanagisawa | B60K 6/46 701/50 |
| 2012/0130576 | A1* | 5/2012 | Sugiyama | B60K 6/12 701/22 |
| 2012/0169358 | A1* | 7/2012 | Ono | B60W 10/08 324/720 |
| 2013/0211649 | A1* | 8/2013 | Tashiro | B60H 1/00735 701/22 |
| 2013/0211650 | A1* | 8/2013 | Tashiro | B60W 10/06 701/22 |
| 2013/0299256 | A1* | 11/2013 | Yamashita | E02F 9/2095 180/68.1 |
| 2014/0067176 | A1* | 3/2014 | Goto | E02F 9/2075 701/22 |
| 2014/0148984 | A1* | 5/2014 | Nishi | B60K 6/485 701/22 |
| 2014/0277970 | A1* | 9/2014 | Sakamoto | E02F 9/123 701/50 |
| 2015/0025726 | A1* | 1/2015 | Yamashita | B60W 10/26 701/22 |
| 2015/0354170 | A1* | 12/2015 | Ishihara | E02F 9/2075 701/22 |
| 2016/0215481 | A1* | 7/2016 | Kawasaki | F15B 21/14 |

FOREIGN PATENT DOCUMENTS

| | | |
|---|---|---|
| JP | 2005-332777 A | 12/2005 |
| JP | 2013-52866 | 3/2013 |
| JP | 2014-47501 | 3/2014 |
| JP | 2015-16824 A | 1/2015 |

* cited by examiner

HYBRID CONSTRUCTION MACHINE

TECHNICAL FIELD

The present invention relates to a hybrid construction machine that performs warming-up control for raising the temperatures of a power storage unit and hydraulic oil.

BACKGROUND ART

A background art is explained with reference to a hybrid shovel as an example.

The hybrid shovel includes an engine functioning as a power source, a generator motor and a hydraulic pump connected to the engine, and a power storage unit charged by power generation operation of the generator motor. In the hybrid shovel, the generator motor timely operates as a motor with electric power of the power storage unit and assists the engine.

In the hybrid shovel, the capacity of the power storage unit decreases when temperature is low. Power storage performance (discharge performance) is deteriorated and sufficient electric power cannot be obtained. Therefore, in the hybrid shovel, in a low-temperature environment in winter and the like, it is desired to take warming-up measures for heating the power storage unit to appropriate temperature like the engine.

As a warming-up technique for the power storage unit, Japanese Unexamined Patent Publication No. 2013-52866 is publicly known.

In Japanese Unexamined Patent Publication No. 2013-52866, when the temperature of the power storage unit drops to a setting value, which indicates a warming-up start temperature, or less, the generator motor forcedly charges and discharges the power storage unit and raises the temperature of the power storage unit with internal heating.

On the other hand, Japanese Unexamined Patent Publication No. H11-117914 discloses a technique for, in order to raise the temperature of hydraulic oil in a short time and with less noise, actuating a hydraulic load (a relief valve) to increase a pump load (=an engine load).

In the case of the hybrid shovel, the generator motor is a load of the engine in addition to the hydraulic pump. Therefore, as explained in Japanese Unexamined Patent Publication No. 2013-52866, when the generator motor is caused to perform the power generation operation to warm up the power storage unit, a load of the engine of the hybrid shovel is basically large compared with a load of the engine of the hydraulic shovel. Note that the power storage unit is charged when the generator motor performs the power generation operation.

However, in Japanese Unexamined Patent Publication No. 2013-52866, since warming-up of the hydraulic oil is performed by applying a hydraulic load simultaneously with the warming-up of the power storage unit, it is likely that the load of the engine becomes excessively large and an engine stall occurs.

Since Japanese Unexamined Patent Publication No. H11-117914 relates to the technique for raising the temperature of the hydraulic oil, there is no disclosure concerning warming up of the power storage unit in Japanese Unexamined Patent Publication No. H11-117914.

SUMMARY OF INVENTION

Therefore, the present invention provides a hybrid construction machine that can prevent an engine stall even if warming up of a power storage unit and warming up of hydraulic oil are simultaneously performed.

A hybrid construction machine according to an aspect of the present invention includes: an engine; a generator motor that is driven by the engine; a hydraulic pump of a variable capacity type that is driven by the engine; a power storage unit that is charged by power generation operation of the generator motor; a power storage temperature detecting unit that detects power storage temperature, which is a temperature of the power storage unit; a power storage SOC detecting unit that detects a power storage SOC, which is a charging state of the power storage unit; a pump-pressure detecting unit that detects a pump pressure for horsepower control of the hydraulic pump; a hydraulic load unit that applies a hydraulic load to the hydraulic pump; and a control unit that performs warming-up control for raising the temperatures of the power storage unit and the hydraulic oil. The control unit includes: a first warming-up control unit that calculates warming-up time charging power, which is charging power during warning up, from the power storage SOC and the power storage temperature and causes the generator motor to perform the power generation operation thereby charging the power storage unit on the basis of the calculated warming-up time charging power; and a second warming-up control unit that applies, during the power generation operation, the hydraulic load to the hydraulic pump by the hydraulic load unit and perform is the horsepower control of the hydraulic pump using a value obtained by subtracting the warming-up time charging power from preset warming-up time pump horsepower.

With this configuration, it is possible to prevent an engine stall eve if the warming-up of the power storage unit and the warming up of the hydraulic oil are simultaneously executed.

DESCRIPTION OF EMBODIMENTS

Figure 1:
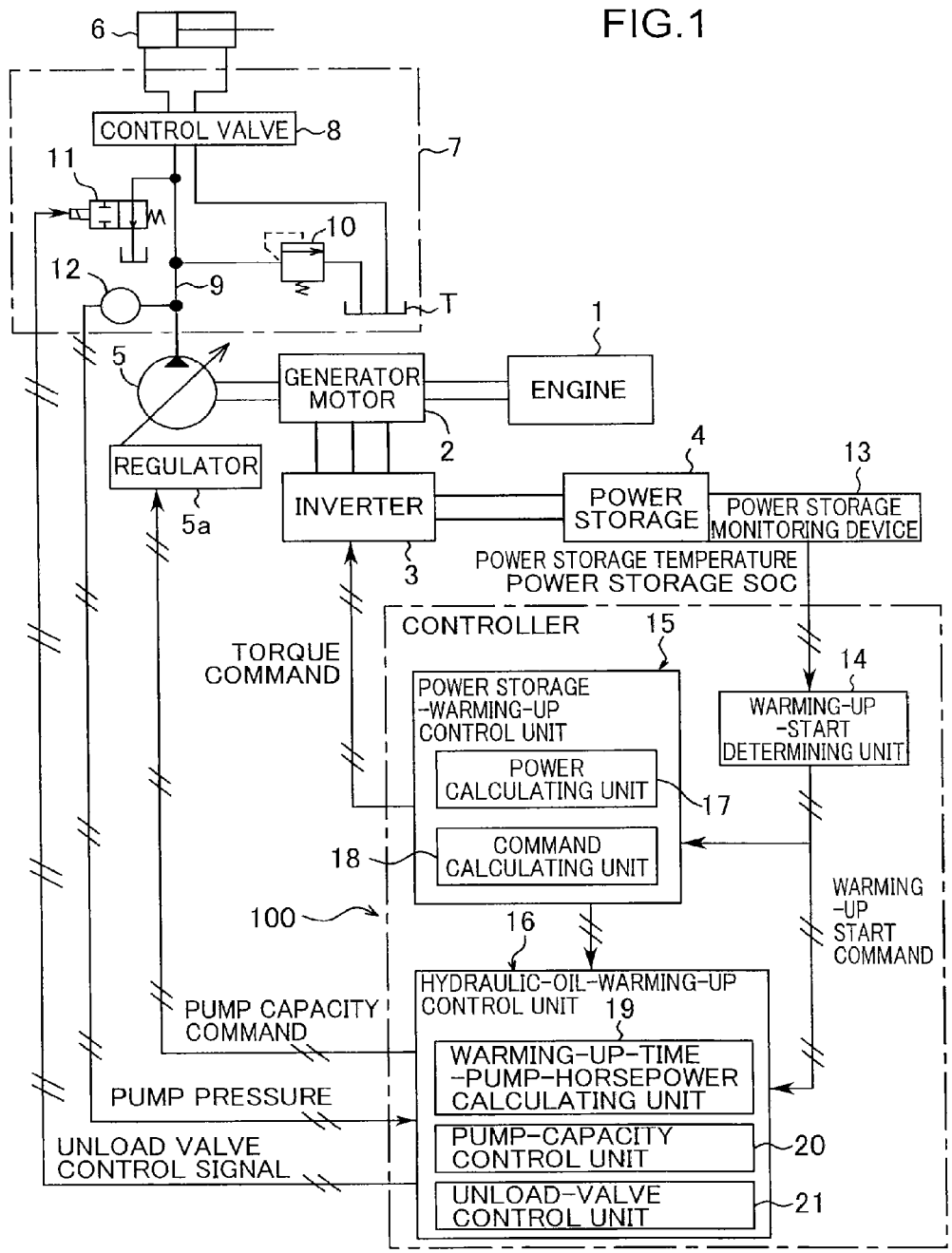
FIG. 1 is a system configuration diagram showing a hybrid construction machine in an embodiment of the present invention.

FIG. 1 is a system configuration diagram showing a hybrid construction machine in an embodiment of the present invention.

As shown in FIG. 1, the hybrid construction machine includes an engine 1 functioning as a power source, a generator motor 2 connected to an output shaft of the engine 1, and an inverter 3 that controls the generator motor 2. The generator motor 2 is driven by the engine 1 to perform power generation operation. Electric power generated in the generator motor 2 by the power generation operation is charged in a power storage unit 4. On the other hand, the generator motor 2 timely operates as a motor with the electric power in the power storage unit 4 and performs assist operation for assisting the engine 1.

The inverter 3 actuates the generator motor 2 as the motor and causes the generator motor 2 to execute the assist operation under control by a power-storage-warming-up control unit 15. The inverter 3 actuates the generator motor 2 as a generator and executes the power generation operation under the control by the power-storage-warming-up control unit 15. In an example shown in FIG. 1, the inverter 3 is configured by a three-phase inverter. However, the inverter 3 may be configured by a single-phase inverter.

The hybrid construction machine further includes the power storage unit 4 and a power storage monitoring device 13.

The power storage unit 4 is configured by a secondary battery such as a lead storage battery, a lithium ion battery, a nickel hydrogen battery, or an electric double-layer capacitor. The power storage unit 4 is charged by electric power generated during the power generation operation of the generator motor 2. The power storage unit 4 supplies electric power to the generator motor 2 via the inverter 3 during the assist operation of the generator motor 2.

The power storage monitoring device 13 includes, for example, a temperature sensor, a current sensor, a voltage sensor, and a processing circuit. The temperature sensor detects a power storage temperature, which is the temperature of the power storage unit 4. The current sensor detects a discharging current and a charging current of the power storage unit 4. The voltage sensor detects the voltage of the power storage unit 4. The processing circuit calculates a power storage SOC (state of charge), which is a charging state of the power storage unit 4, using integrated values of the discharging current and the charging current detected by the current sensor. Note that the processing circuit may calculate the power storage SOC using the voltage detected by the voltage sensor. The power storage monitoring device 13 configures an example of the power storage temperature detecting unit and the power storage SOC detecting unit.

The hybrid construction machine further includes a hydraulic pump 5, a hydraulic actuator 6, a hydraulic actuator circuit 7, and a controller 100 (an example of the control unit).

The hydraulic pump 5 is connected to the output shaft of the engine 1. The hydraulic pump 5 and a tank T are connected to one or a plurality of hydraulic actuators (in the figure, only one hydraulic actuator is illustrated) 6 by the hydraulic actuator circuit 7.

The hydraulic pump 5 is configured by a variable capacity pump. The hydraulic pump 5 includes a regulator 5a. The capacity of the hydraulic pump 5 is controlled by the regulator 5a.

The hydraulic actuator circuit 7 includes a control valve 8 that controls supply and non-supply of the hydraulic oil to the hydraulic actuator 6 and a pump conduit 9 for supplying the hydraulic oil discharged from the hydraulic pump 5 to the hydraulic actuator 6 through the control valve 8.

The hydraulic actuator circuit 7 further includes a relief valve 10, the tank T, an unload valve 11, and a pump pressure sensor 12 (an example of the pump-pressure detecting unit). The relief valve 10 and the unload valve 11 are equivalent to an example of the hydraulic load unit.

The relief valve 10 is provided between the pump conduit 9 and the tank T and sets a maximum pressure of the hydraulic actuator circuit 7. The unload valve 11 opens and closes to actuate the relief valve 10 during the warming up of the hydraulic oil. The relief valve 10 opens when pressure on a primary side rises to a predetermined upper limit pressure or more and limits a rise in hydraulic pressure.

The pump pressure sensor 12 detects a discharge pressure (a pump pressure) of the hydraulic pump 5.

The controller 100 includes a warming-up-start determining unit 14, a power-storage-warming-up control unit 15, and a hydraulic-oil-warming-up control unit 16. The controller 100 is configured by a processor such as a CPU. For example, the warming-up-start determining unit 14, the power-storage-warming-up control unit 15, and the hydraulic-oil-warming-up control unit 16 may be configured by the CPU executing computer programs or may be realized by dedicated hardware circuits. In this embodiment, the inverter 3 and the power-storage-warming-up control unit 15 are equivalent to an example of the first warming-up control unit. The hydraulic-oil-warming-up control unit 16 is equivalent to an example of the second warming-up control unit.

The warming-up-start determining unit 14 receives the power storage SOC detected by the power storage monitoring device 13 and the power storage temperature, which is the temperature of the power storage unit 4. The power-storage-warming-up control unit 15 performs warming-up control of the power storage unit 4. The hydraulic-oil-warming-up control unit 16 performs warming-up control of the hydraulic oil.

When the temperature of the power storage unit 4 drops to a warming-up start temperature set in advance or less, the warming-up-start determining unit 14 sends a command for starting the warming up (a warming-up start command) to the power-storage-warming-up control unit 15 and the hydraulic-oil-warming-up control unit 16.

The power-storage-warming-up control unit 15 includes a power calculating unit 17 and a command calculating unit 18.

Figure 2:
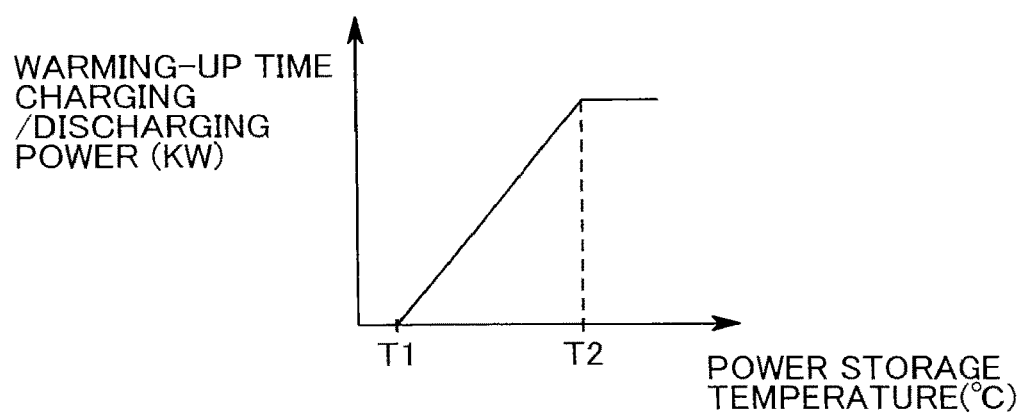
FIG. 2 is a diagram showing a relation between power storage temperature and warming-up time charging/discharging power.
Figure 3:
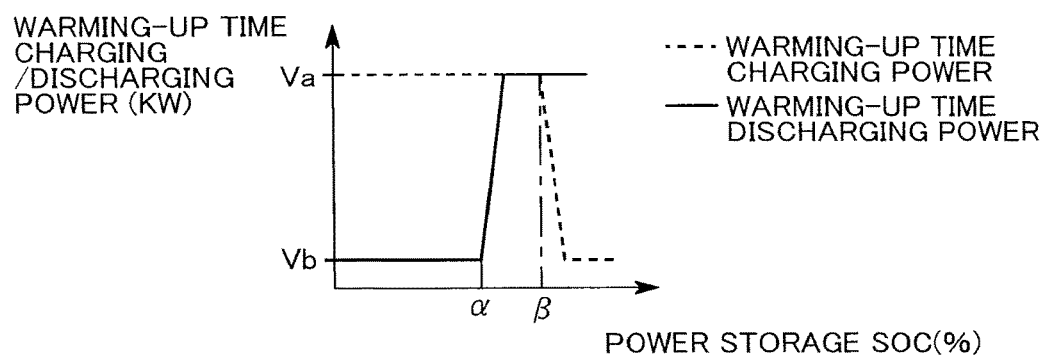
FIG. 3 is a diagram showing a relation between a power storage SOC and the warming-up time charging/discharging power.

The power calculating unit 17 stores a power map in which a characteristic of warming-up time charging/discharging power with respect to power storage temperature shown in FIG. 2 and a characteristic of charging/discharging power with respect to a power storage SOC shown in FIG. 3 are combined. The power calculating unit 17 calculates warming-up time charging power and warming-up time discharging power for warming up of the power storage unit 4 using the power storage temperature and the power storage SOC detected by the power storage monitoring device 13 and the power map.

The power map includes a data structure in which, for example, the power storage SOC is plotted on the abscissa and the power storage temperature is plotted on the ordinate and specific numerical values are allocated to intersections of a lattice of a two-dimensional coordinate space where the power storage SOC increases rightward and the power storage temperature increases downward. Note that, in the power map, an interval between the numerical values is supplemented by a complementary operation.

As shown in FIG. 2, both of the warming-up time charging power and the warming-up time discharging power are smaller as the power storage temperature is lower and are larger as the power storage temperature is higher. In an example shown in FIG. 2, when the power storage temperature exceeds T1, both of the warming-up time charging power and the warming-up time discharging power linearly increase as the power storage temperature rises. When the power storage temperature exceeds T2, both of the warming-up time charging power and the warming-up time discharging power maintain fixed values.

This takes into account a point that the internal resistance of the power storage unit 4 decreases as the power storage temperature is higher.

The characteristic of the charging/discharging power shown in FIG. 3 has a relation in which the warming-up time charging power is small and the warming-up time discharging power is large in a state in which the power storage SOC is high and has an opposite relation in a state in which the power storage SOC is low. In an example shown in FIG. 3, the warming-up time charging power maintains a first value Va until the power storage SOC exceeds $\beta$. When the power storage SOC exceeds $\beta$, the warming-up time charging power decreases to a second value Vb smaller than the first value Va. This takes into account a point that, if large power is applied to the power storage unit 4 when the power storage SOC is large, the power storage unit 4 changes to an overcharged state.

When the power storage SOC decreases to near $\alpha$ ($<\beta$), the warming-up time discharging power decreases from the first value Va to the second value Vb. This takes into account a point that, if large power is extracted from the power storage unit 4 when the power storage SOC is small, the power storage unit 4 changes to an over-discharged state.

Specifically, the power map includes a charging power map and a discharging power map.

In the charging power map, a combined value of the warming-up time charging power shown in FIG. 2 and the warming-up time charging power shown in FIG. 3 is specified. In the discharging power map, a combined value of the warming-up time discharging power shown in FIG. 2 and the warming-up time discharging power shown in FIG. 3 is specified. As the combined value, for example, an arithmetic means, a geometric mean, or a weighted mean can be adopted.

As shown in FIG. 2, the warming-up time charging power increases as the power storage temperature rises. On the other hand, as shown in FIG. 3, the warming-up time charging power decreases from the first value Va to the second value Vb when the power storage SOC reaches $\beta$. Therefore, the warming-up time charging power has a characteristic that the warming-up time charging power increases as the power storage temperature rises and decreases when the power storage SOC exceeds $\beta$.

As shown in FIG. 2, the warming-up time discharging power increases as the power storage temperature rises. On the other hand, as shown in FIG. 3, the warming-up time discharging power increases from the second value Vb to the first value Va when the power storage SOC is near $\alpha$. Therefore, the warming-up time discharging power has a characteristic that the warming-up time discharging power increases as the power storage temperature rises and further increases when the power storage SOC exceeds $\alpha$.

Referring back to FIG. 1, the command calculating unit 18 calculates a torque command (a power generation torque command) for actuating the generator motor 2 as the generator with the warming-up time charging power calculated by the power calculating unit 17 and outputs the calculated power generation torque command to the inverter 3. Consequently, the inverter 3 actuates the generator motor 2 as the generator with the warming-up time charging power indicated by the power generation torque command and causes the generator motor 2 to perform the power generation operation.

The command calculating unit 18 calculates a torque command (an assist torque command) for actuating the generator motor 2 as the motor with the warming-up time discharging power calculated by the power calculating unit 17 and outputs the calculated assist torque command to the inverter 3. Consequently, the inverter 3 actuates the generator motor 2 as the motor with the warming-up time discharging power indicated by the assist torque command and causes the generator motor 2 to perform the assist operation.

Figure 4A:
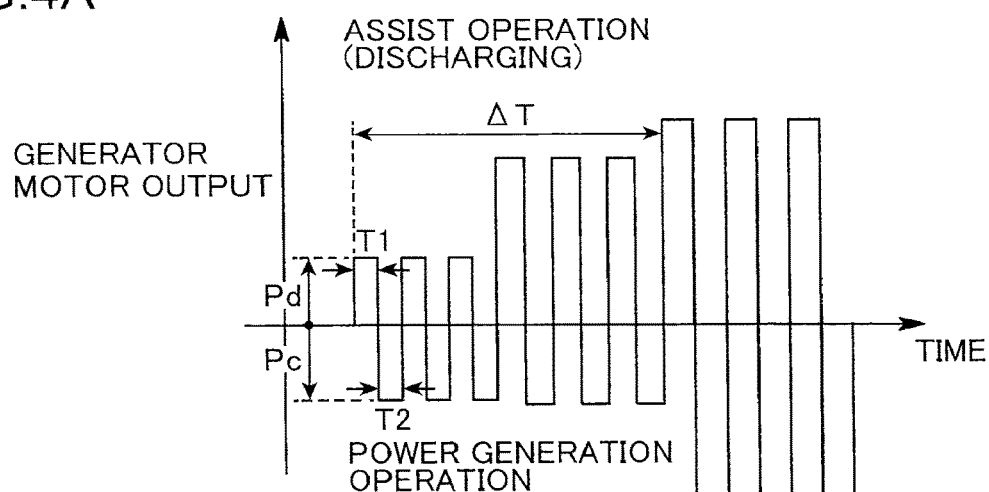
FIG. 4A is a waveform chart of an output of a generator motor with respect to elapsed time and FIG. 4B is a waveform chart of pump horsepower with respect to elapsed time.
Figure 4B:
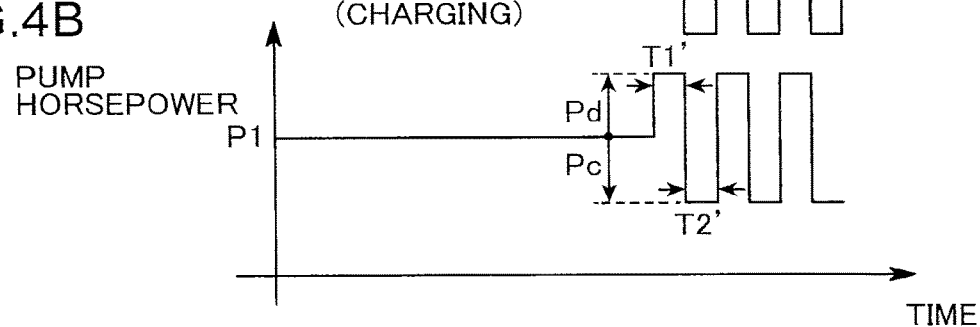

The command calculating unit 18 causes the generator motor 2 to alternately perform the power generation operation and the assist operation. FIG. 4A is a waveform chart of an output of the generator motor 2 with respect to elapsed time. FIG. 4B is a waveform chart of pump horsepower with respect to elapsed time. In FIG. 4A, the assist operation is performed when the output of the generator motor 2 is positive. The power generation operation is performed when the output of the generator motor 2 is negative.

As shown in FIG. 4A, the command calculating unit 18 controls the generator motor 2 such that the power generation operation and the assist operation are alternately switched at a fixed cycle. Since the power generation operation and the assist operation are repeated in this way, the warming up of the power storage unit 4 is performed.

Referring back to FIG. 1, the hydraulic-oil-warming-up control unit 16 includes a warming-up-time-pump-horsepower calculating unit 19, a pump-capacity control unit 20 that controls the capacity of the hydraulic pump 5 (=a pump discharge amount), and an unload-valve control unit 21. The hydraulic-oil-warming-up control unit 16 closes a valve of the unload valve 11 to apply a hydraulic load to the hydraulic pump 5. At this point, the hydraulic-oil-warming-up control unit 16 warms up the hydraulic oil by performing horsepower control of the hydraulic pump 5 corresponding to the power generation operation and the assist operation of the generator motor 2.

That is, when the generator motor 2 is caused to perform the power generation operation while the pump horsepower is kept the same as that of the normal hydraulic shovel, it is likely the load of the engine 1 becomes excessively large and the engine 1 causes an engine stall.

Therefore, during the power generation operation of the generator motor 2, the warming-up-time-pump-horsepower calculating unit 19 calculates, as target pump horsepower, a value obtained by subtracting the warming-up time charging power from warming-up time pump horsepower (a fixed value) set in advance.

The pump-capacity control unit 20 calculates a pump capacity from the pump pressure detected by the pump pressure sensor 12 and the target pump horsepower and controls the regulator 5a to set the pump capacity of the hydraulic pump 5 to the calculated pump capacity.

During the assist operation of the generator motor 2, since the engine 1 is assisted by the generator motor 2, the power of the engine 1 decreases. Therefore, in order to improve warming-up efficiency, the warming-up-time-pump-horsepower calculating unit 19 calculates, as the target pump horsepower, a value obtained by adding the warming-up time discharging power to the warming-up time pump horsepower and performs pump horsepower control.

Processing of the warming-up-time-pump-horsepower calculating unit 19 is summarized as described below.

(I) During the Power Generation Operation of the Generator Motor 2

Target pump horsepower=warming-up time pump horsepower set in advance−warming-up time charging power (II) During the Assist Operation of the Generator Motor 2

Target pump horsepower=warming-up time pump
horsepower set in advance+warming-up time
discharging power The processing of the warming-up-time-pump-horsepower calculating unit 19 is explained with reference to FIGS. 4A and 4B.

In a period T1, the assist operation is performed. It is assumed that the warming-up time discharging power calculated by the power calculating unit 17 at this point is Pd. In this case, the warming-up-time-pump-horsepower calculating unit 19 calculates the target pump horsepower according to the calculation (II) P1+Pd in a period T1' when a delay time ΔT elapses from the period T1. The delay time ΔT is determined taking into account time necessary for the power calculating unit 17 to calculate warming-up time charging power Pc and warming-up-time discharging power Pd and time necessary for the warming-up-time-pump-horsepower calculating unit 19 to receive the warming-up time charging power Pc and the warming-up time discharging power Pd calculated by the power calculating unit 17.

In a period T2, the power generation operation is performed. It is assumed that the warming-up time charging power at this point is Pc. In this case, the warming-up-time-pump-horsepower calculating unit 19 calculates the target pump horsepower according to the calculation (I) P1−Pc in a period T2' when the delay time ΔT elapses from the period T2. Note that, if the delay time ΔT1 is negligibly small, a shift between the period T1 and the period T1' and a shift between the period T2 and the period T2' do not occur.

Referring back to FIG. 1, the unload valve 11 is configured by, for example, an electromagnetic control valve, an opening degree of which changes between full open and full close according to an electric signal. The unload valve 11 is controlled by the unload-valve control unit 21.

Specifically, during normal control for not warming up the hydraulic oil, when a not-shown operation lever is operated, the unload-valve control unit 21 controls the unload valve 11 to an opening degree corresponding to a lever operation amount. Consequently, excess oil exceeding a flow rate required by the hydraulic actuator 6 is unloaded.

On the other hand, during the warming up of the hydraulic oil, the unload-valve control unit 21 fully closes the unload valve 11 and increases the hydraulic pressure to warm up the hydraulic oil. When the pressure on the primary side of the relief valve 10 increases to a predetermined upper limit pressure or more, the relief valve 10 opens and the increase in the hydraulic pressure is limited.

Note that a hydraulic pilot valve may be used as the unload valve 11. In this case, an opening degree of the unload valve 11 only has to be controlled through an electromagnetic proportional valve.

The action explained above is collectively explained with reference to a flowchart of FIG. 5A and FIG. 5B.

Figure 5A:
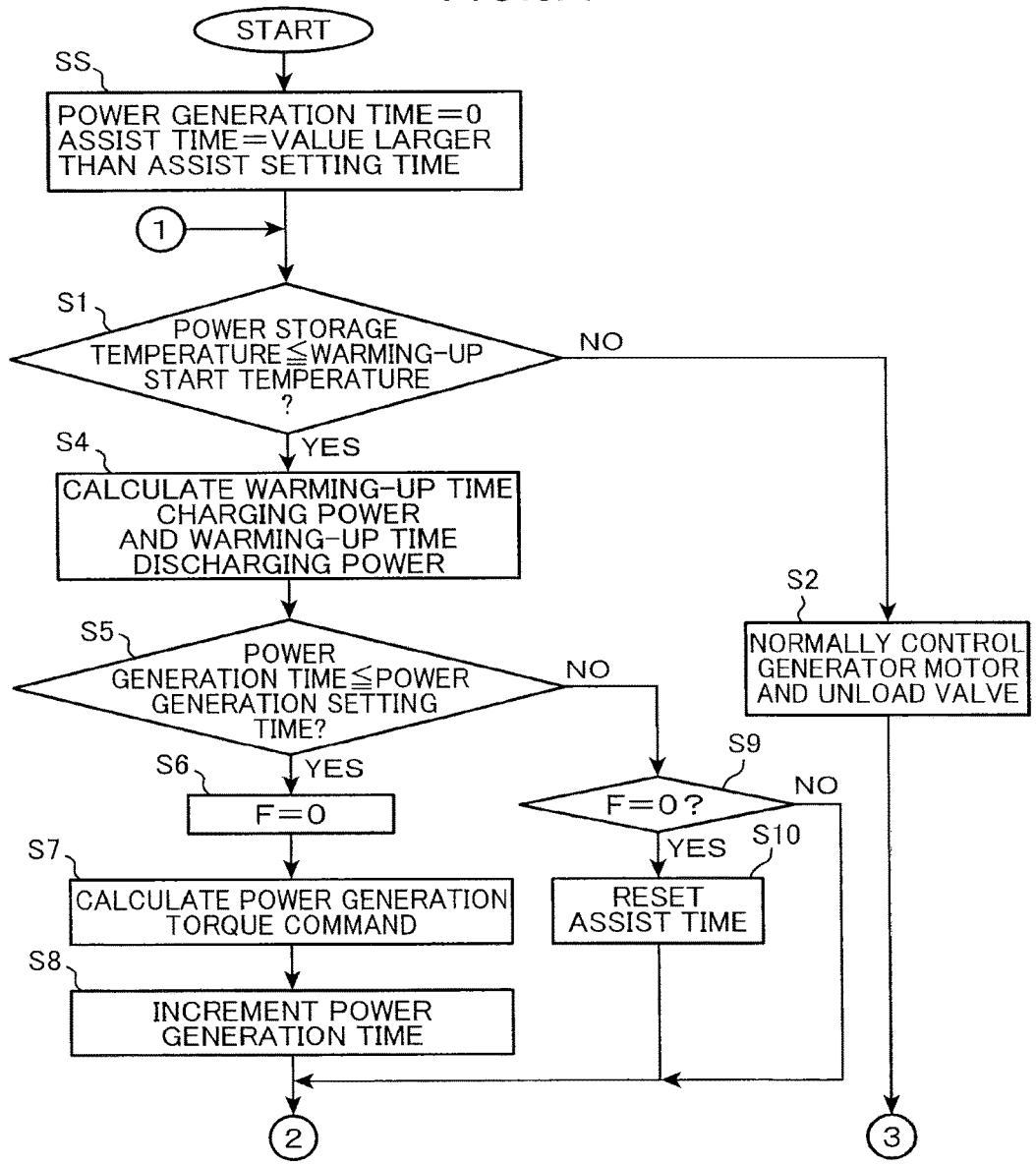
FIG. 5A is a flowchart for explaining the operation of the hybrid construction machine in the embodiment of the present invention.
Figure 5B:
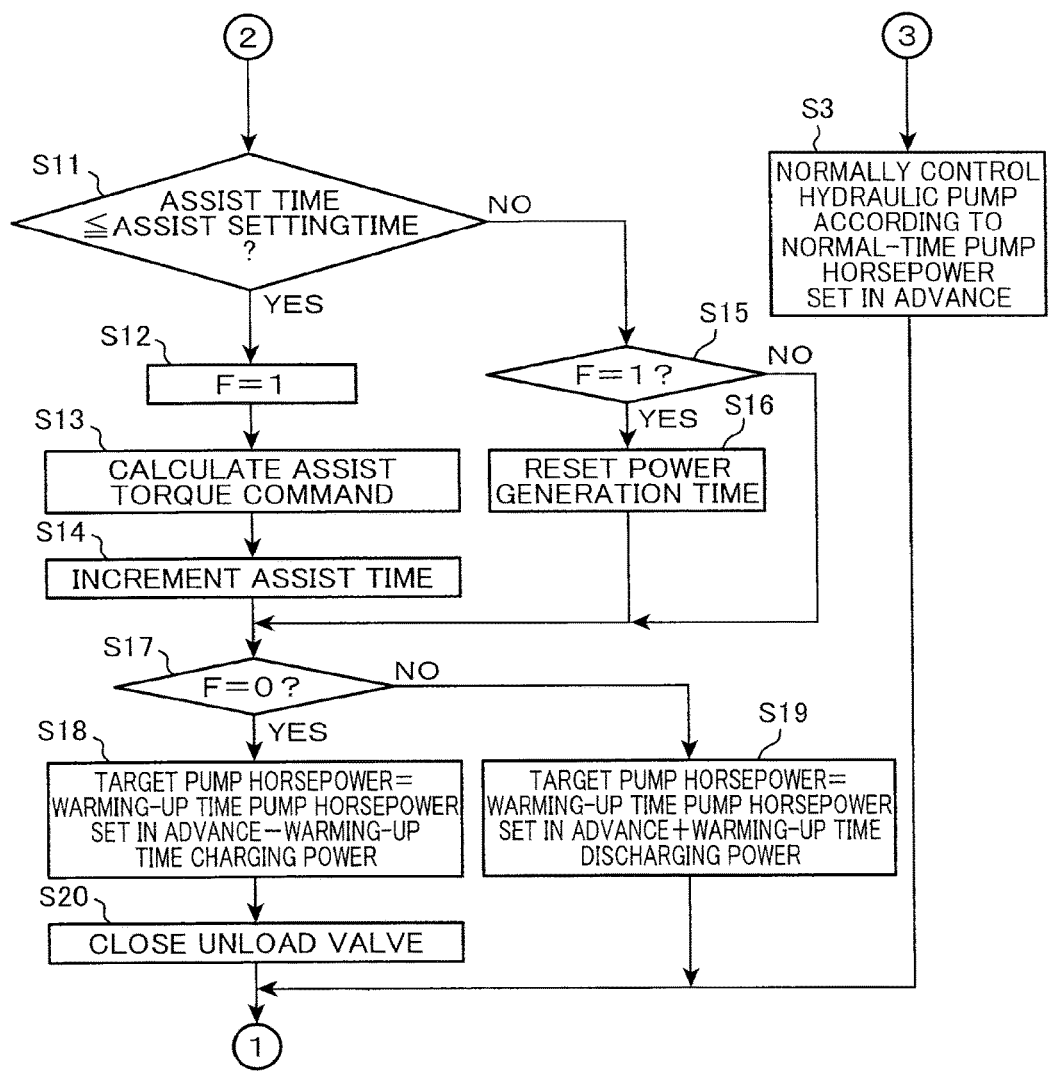
FIG. 5B is a flowchart for explaining the operation of the hybrid construction machine in the embodiment of the present invention.

The flowchart of FIG. 5A is started by, for example, the start of the engine 1. First, in step SS, a power generation time, which is elapsed time of the power generation operation, is set to 0. An assist time, which is elapsed time of the assist operation, is set to a value larger than an assist setting time. The assist time is set to the value larger than the assist setting time in order to determine NO in step S11 not to execute the assist operation shown in steps S11 to S14 during the power generation operation.

In step S1, the warming-up-start determining unit 14 determines whether a power storage temperature detected by the power storage monitoring device 13 is lower than a warming-up start temperature set in advance.

If the power storage temperature is higher than the warming-up start temperature (NO in step S1), the warming-up-start determining unit 14 determines that warming up is unnecessary and advances the processing to step S2. In step S2, the command calculating unit 18 normally controls the generator motor 2. The unload-valve control unit 21 normally controls the unload valve 11. In step S3, the pump-capacity control unit 20 controls the hydraulic pump 5 using normal time pump horsepower set in advance. Consequently, the hydraulic pump 5 is normally controlled. When the processing in step S3 ends, the processing is returned to step S1.

If the power storage temperature is equal to or lower than the warming-up start temperature (YES in step S1), the warming-up-start determining unit 14 determines that warming-up is necessary and advances the processing to step S4. In step S4, the power calculating unit 17 calculates warming-up time charging power and warming-up time discharging power corresponding to the power storage SOC and the power storage temperature with reference to the power map.

If the power generation time is equal to or smaller than a power generation setting time in step S5 (YES in step S5), the command calculating unit 18 advances the processing to step S6. As the power generation setting time, a fixed value decided in advance is adopted.

In step S6, the command calculating unit 18 sets a flag F indicating whether the generator motor 2 is performing the power generation operation or the assist operation to F=0. F=0 indicates that the generator motor 2 is performing the power generation operation. F=1 indicates that the generator motor 2 is performing the assist operation.

In step S7, the command calculating unit 18 calculates a power generation torque command for actuating the generator motor 2 with the warming-up time charging power calculated in step S4 and outputs the power generation torque command to the inverter 3. Consequently, as shown on the negative side of FIG. 4A, the generator motor 2 performs the power generation operation and the power storage unit 4 is charged.

In step S8, the command calculating unit 18 increments the power generation time.

Note that, if the power generation time is larger than the power generation setting time in step S5 (NO in step S5), the processing proceeds to step S9.

If, in step S9, the flag F is F=0, that is, the flag F indicates that the generator motor 2 is performing the power generation operation (YES in step S9), the command calculating unit 18 resets the assist time to 0 (step S10) and advances the processing to step S11.

On the other hand, if, in step S9, the flag F is F=1, that is, the flag F indicates that the generator motor 2 is performing the assist operation (NO in step S9), the command calculating unit 18 advances the processing to step S11. During the power generation operation, until the power generation time increases to a value larger than the power generation setting time, the flag F is maintained at 0 (step S6) and the assist time is maintained at a value larger than the assist setting time (NO in step S9). Therefore, it is determined NO in step S11 and step S15. The processing of the assist operation (steps S11 to S14) is not performed. The processing of the power generation operation (steps S5 to S8) is repeated.

In step S11, the command calculating unit 18 determines whether the assist time is equal to or smaller than the assist setting time. As the assist setting time, a fixed value decided in advance is adopted. In this embodiment, the assist setting time and the power generation setting time are set to the same time. However, the assist setting time and the power generation setting time are not limited to this.

If the assist time is equal to or smaller than the assists setting time (YES in step S11), the command calculating unit 18 sets the flag F to F=1, that is, sets the flag F to indicate that the generator motor 2 is performing the assist operation (step S12).

In step S13, the command calculating unit 18 calculates an assist torque command for actuating the generator motor 2 with the warming-up time discharging power calculated in step S4. Consequently, as shown on the positive side of FIG. 4A, the generator motor 2 assists the engine 1 with electric power discharged by the power storage unit 4.

In step S14, the command calculating unit 18 increments the assist time.

In step S17, the command calculating unit 18 determines whether the flag F is F=0, that is, the generator motor 2 is performing the power generation operation.

Note that, if the assist time is larger than the assist setting time in step S11 (NO in step S11), the processing proceeds to step S15.

If, in step S15, the flag F is F=1, that is, the flag F indicates that the generator motor 2 is performing the assist operation (YES in step S15), the command calculating unit 18 resets the power generation time to 0 (step S16) and advances the processing to step S17.

On the other hand, if, in step S15, the flag F is F=0, that is, the flag F indicates that the generator motor 2 is performing the power generation operation (NO in step S15), the command calculating unit 18 advances the processing to step S17. During the assist operation, until the assist time increases to a value larger than the assist setting time, the flag F is maintained at 1 (step S12) and the power generation time is maintained at a value larger than the power generation setting time (NO in step S15). Therefore, it is determined NO in step S5 and step S9. The processing of the power generation operation (steps S5 to S8) is not performed. The processing of the assist operation (steps S11 to S14) is repeated.

In step S17, the warming-up-time-pump-horsepower calculating unit 19 determines whether the flag F is F=0, that is, the flag F indicates the power generation operation. If the flag F is F=0, that is, the flag F indicates the power generation operation in step S17 (YES in step S17), the warming-up-time-pump-horsepower calculating unit 19 calculates target pump horsepower according to processing described below (step S18).

Target pump horsepower=warming-up time pump horsepower−warming-up time charging power On the other hand, if the flag is F=1, that is, the flag F indicates the assist operation in step S17 (NO in step S17), the warming-up-time-pump-horsepower calculating unit 19 calculates the target pump horsepower according to processing described below (step S19).

Target pump horsepower=warming-up time pump horsepower set in advance+warming-up time discharging power Consequently, pump horsepower control shown in FIG. 4B is realized.

In step S20, the unload-valve control unit 21 closes the unload valve 11 and returns the processing to step S1.

Consequently, the unload valve 11 is actuated simultaneously when the pump horsepower control is performed. Therefore, warming up of the hydraulic oil is performed.

In this embodiment, the warming up of the power storage unit 4 is executed by the power generation operation of the generator motor 2 (the charging of the power storage unit 4). The pump horsepower control is performed in a state in which a hydraulic load is applied by the relief valve 10, whereby the warming up of the hydraulic oil is executed. Therefore, in this embodiment, it is possible to simultaneously execute the warming up of the power storage unit 4 and the warming-up of the hydraulic oil.

In this case, the warming-up time charging power, which is a load by the power generation operation of the generator motor 2, is subtracted from the warming-up time pump horsepower. The pump horsepower control of the hydraulic pump 5 is performed. Therefore, in this embodiment, it is possible to suppress a load on the engine 1 during the warming up and avoid an engine stall.

In this embodiment, the assist operation is also performed for the generator motor 2 (discharging for the power storage unit 4). Therefore, it is possible to improve warming-up efficiency of the power storage unit 4.

In this case, the horsepower control of the hydraulic pump 5 is performed using a value obtained by adding the warming-up time discharging power to the warming-up time pump horsepower set in advance. Therefore, in this embodiment, it is possible to improve warming-up efficiency of the hydraulic oil while avoiding an engine stall.

Further, in this embodiment, the charging and the discharging of the power storage unit 4 arc alternately and equally performed. Therefore, it is possible to further improve the warming-up efficiency of the power storage unit 4.

Further, in this embodiment, the power storage temperature is detected and, when the detected power storage temperature drops to the warming-up start temperature set in advance or less, the warming up is automatically started. Therefore, for example, compared with a configuration in which warming up is started by switch operation of an operator, in this embodiment, it is possible to improve certainty of the warming up.

OTHER EMBODIMENTS (1) In the embodiment, as the hydraulic load for the hydraulic oil warming up, the configuration is adopted in which the unload valve 11 and the relief valve 10 are combined. The present invention is not limited to this. A configuration may be adopted in which a valve exclusive for warming up such as a variable throttle valve is provided and the valve exclusive for warming up is actuated to warm up the hydraulic oil.

(2) In the embodiment, the target pump horsepower is calculated by the processing described below during the assist operation of the generator motor 2.

Target pump horsepower=warming-up time pump horsepower set in advance+warming-up time discharging power The present invention is not limited to this. The target pump horsepower may be calculated by processing explained below during the assist operation.

Target pump horsepower=warming-up time pump horsepower set in advance (3) The present invention is not limited to the hybrid shovel and can also be applied to hybrid construction machines other than the hybrid shovel.

SUMMARY OF THIS EMBODIMENT

The hybrid construction machine in this embodiment includes: an engine; a generator motor that is driven by the engine; a hydraulic pump of a variable capacity type that is driven by the engine; a power storage unit that is charged by power generation operation of the generator motor; a power storage temperature detecting unit that detects power storage temperature, which is a temperature of the power storage unit; a power storage SOC detecting unit that detects a power storage SOC, which is a charging state of the power storage unit; a pump-pressure detecting unit that detects a pump pressure for horsepower control of the hydraulic pump; a hydraulic load unit that applies a hydraulic load to the hydraulic pump; and a control unit that performs warming-up control for raising the temperatures of the power storage unit and the hydraulic oil. The control unit includes: a first warming-up control unit that calculates warming-up time charging power, which is charging power during warming up, from the power storage SOC and the power storage temperature and causes the generator motor to perform the power generation operation thereby charging the power storage unit on the basis of the calculated warming-up time charging power; and a second warming-up control unit that applies, during the power generation operation, the hydraulic load to the hydraulic pump by the hydraulic load unit and performs the horsepower control of the hydraulic pump using a value obtained by subtracting the warming-up time charging power from preset warming-up time pump horsepower.

With this configuration, the power storage unit can be warmed up by the power generation operation of the generator motor (the charging of the power storage unit). The hydraulic oil can be warmed up by performing the pump horsepower control while applying the hydraulic load. That is, it is possible to simultaneously perform the warming-up of the power storage unit and the warming-up of the hydraulic oil.

In this case, the warming-up time charging power, which is a load of the engine by the power generation operation, is subtracted from the warming-up time pump horsepower set in advance. The horsepower control of the hydraulic pump is performed. Therefore, the hybrid construction machine in this embodiment can prevent a situation in which a load of the engine becomes excessively large during the warming up and an engine stall occurs.

In the configuration, the first warming-up control unit may calculate warming-up discharging power, which is discharging power during warming-up, from the power storage SOC and the power storage temperature and cause the generator motor to perform assist operation of the engine on the basis of the calculated warming-up time discharging power.

With this configuration, the assist operation (discharging of the power storage unit) is performed in addition to the power generation operation (the charging of the power storage unit). Therefore, it is possible to improve warming-up efficiency of the power storage unit.

In the configuration, during the assist operation, the first warming-up control unit may perform horsepower control of the hydraulic pump using a value obtained by adding the warming-up time discharging power to the warming-up time pump horsepower.

Since the engine is assisted by the generator motor, a load is reduced. Therefore, in this configuration, during the assist operation, the warming-up time pump horsepower set in advance is increased by the warming-up time discharging power. Therefore, it is possible to improve warming-up efficiency of the hydraulic oil and, at the same time, prevent an engine stall.

In the configuration, the first warming-up control unit may cause the generator motor to alternately perform the power generation operation and the assist operation.

With this configuration, since the charging and the discharging of the power storage unit are alternately performed, it is possible to improve the warming-up efficiency of the power storage unit.

In the configuration, the first warming-up control unit may start the warming-up when the power storage temperature detected by the power storage temperature detecting unit drops to a warming-up start temperature set in advance or less.

With this configuration, in a state in which the warming-up of the power storage unit is necessary, the warming-up is automatically started. Therefore, for example, compared with a configuration in which warming up is started by switch operation of an operator, it is possible to surely execute the warming up.

This application is based on Japanese Patent application No. 2015-036577 filed in Japan Patent Office on Feb. 26, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A hybrid construction machine comprising:
an engine;
a generator motor that is driven by the engine;
a hydraulic pump of a variable capacity type that is driven by the engine;
a power storage unit that is charged by power generation operation of the generator motor;
a power storage temperature detecting unit that detects power storage temperature, which is a temperature of the power storage unit;
a power storage SOC detecting unit that detects a power storage SOC, which is a charging state of the power storage unit;
a pump-pressure detecting unit that detects a pump pressure for horsepower control of the hydraulic pump;
a hydraulic load unit that applies a hydraulic load to the hydraulic pump; and
a control unit that performs warming-up control for raising temperatures of the power storage unit and the hydraulic oil, wherein
the control unit includes:
a first warming-up control unit that calculates warming-up time charging power, which is charging power during warming up from the power storage SOC and the power storage temperature, and causes the generator motor to perform the power generation operation, thereby charging the power storage unit on the basis of the calculated warming-up time charging power, wherein the first warming-up control unit includes an inverter and a power-storage warming-up control unit, the first warming-up control unit calculates a torque command for actuating the generator motor as the generator with the calculated warming-up time charging power, and the inverter actuates the generator motor as the generator with the warming-up time charging power indicated by the torque command, thereby performing the warming-up control; and a second warming-up control unit that applies, during the power generation operation, the hydraulic load to the hydraulic pump by the hydraulic load unit and performs the horsepower control of the hydraulic pump using a value obtained by subtracting the warming-up time charging power from preset warming-up time pump horsepower.

2. The hybrid construction machine according to claim 1, wherein the first warming-up control unit calculates warming-up discharging power, which is discharging power during warming-up from the power storage SOC and the power storage temperature, and causes the generator motor to perform assist operation of the engine on the basis of the calculated warming-up time discharging power.

3. The hybrid construction machine according to claim 2, wherein, during the assist operation, the first warming-up control unit performs horsepower control of the hydraulic pump using a value obtained by adding the warming-up time discharging power to the warming-up time pump horsepower.

4. The hybrid construction machine according to claim 2, wherein the first warming-up control unit causes the generator motor to alternately perform the power generation operation and the assist operation.

5. The hybrid construction machine according to claim 1, wherein the first warming-up control unit starts the warming-up when the power storage temperature detected by the power storage temperature detecting unit drops to a preset warming-up start temperature or less.

* * * * *